(12) United States Patent
Fukui

(10) Patent No.: US 7,388,612 B2
(45) Date of Patent: Jun. 17, 2008

(54) IMAGE PICKUP APPARATUS AND METHOD, RECORDING MEDIUM, AND PROGRAM PROVIDING USER SELECTED HUE AND WHITE BALANCE SETTINGS

(75) Inventor: Takaaki Fukui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 800 days.

(21) Appl. No.: 10/714,632

(22) Filed: Nov. 18, 2003

(65) Prior Publication Data
US 2004/0165094 A1 Aug. 26, 2004

(30) Foreign Application Priority Data
Nov. 26, 2002 (JP) ............... 2002-342770

(51) Int. Cl.
*H04N 5/222* (2006.01)
(52) U.S. Cl. ................................ 348/333.12
(58) Field of Classification Search ............ 348/223.1, 348/222.1, 333.11, 333.12
See application file for complete search history.

(56) References Cited

U.S. PATENT DOCUMENTS

| | | | |
|---|---|---|---|
| 6,380,972 B1* | 4/2002 | Suga et al. .......... | 348/211.99 |
| 6,788,339 B1* | 9/2004 | Ikeda ................. | 348/223.1 |
| 6,928,187 B2* | 8/2005 | Cooper et al. ........ | 382/167 |
| 7,084,907 B2* | 8/2006 | Takeshita ............ | 348/223.1 |
| 7,098,944 B1* | 8/2006 | Shiraiwa et al. ..... | 348/222.1 |
| 7,136,103 B2* | 11/2006 | Oeda et al. .......... | 348/333.02 |
| 7,212,234 B2* | 5/2007 | Sakaguchi et al. ... | 348/223.1 |
| 2003/0011686 A1* | 1/2003 | Higuchi .............. | 348/223.1 |
| 2003/0146984 A1* | 8/2003 | Sakaguchi et al. ... | 348/223.1 |
| 2007/0024719 A1* | 2/2007 | Sakurai .............. | 348/223.1 |

FOREIGN PATENT DOCUMENTS

| | | |
|---|---|---|
| JP | 7-23400 | 1/1995 |
| JP | 10-210495 | 8/1998 |
| JP | 11-331665 | 11/1999 |

OTHER PUBLICATIONS

U.S. Appl. No. 10/452,225, filed Jun. 3, 2003, T. Fukui.

* cited by examiner

*Primary Examiner*—Tuan Ho
*Assistant Examiner*—Amy Hsu
(74) *Attorney, Agent, or Firm*—Fitzpatrick, Cella, Harper & Scinto

(57) ABSTRACT

An image pickup apparatus permits easy setting of an optimum hue of an image to be shot by displaying a hue chart in the image pickup apparatus, thereby enabling the user to visually check each hue set in the process of selecting an optimum hue according to the taste or intention of the user or the place where he or she is located. The user arbitrarily designates a tracing range of white balancing. Then, the tracing range parameters for achromatic color determination are selected on the basis of the designated tracing range. White balancing is carried out on an image signal output from an imaging element using the selected tracing range parameters. Based on the image signal that has been subjected to the white balancing, a color signal and a luminance signal are generated and output, thereby enabling the user to set or check an achromatic color determining range for white balancing.

15 Claims, 15 Drawing Sheets

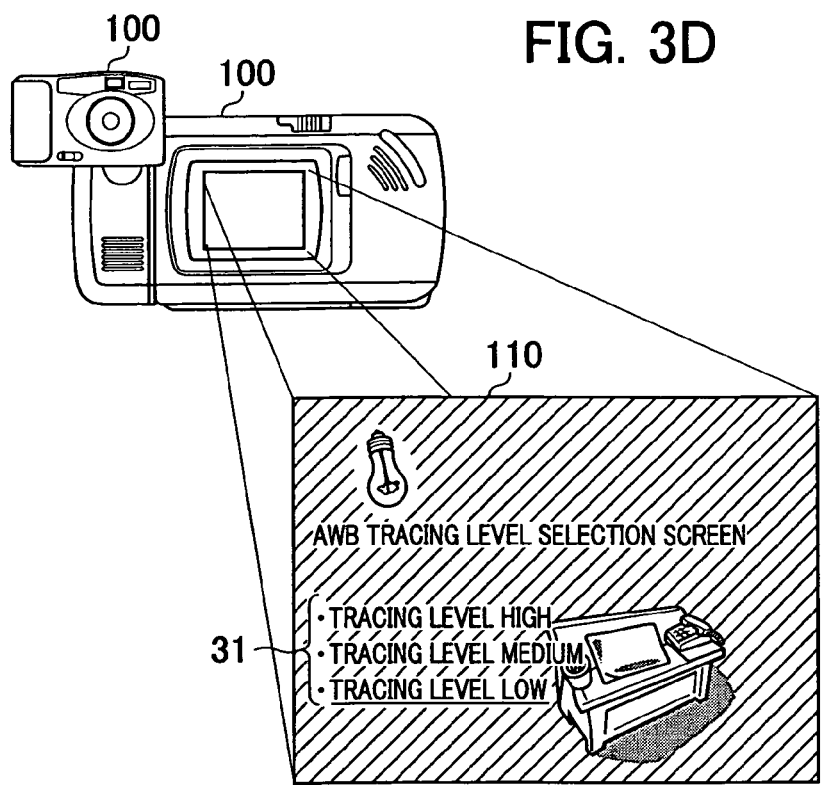
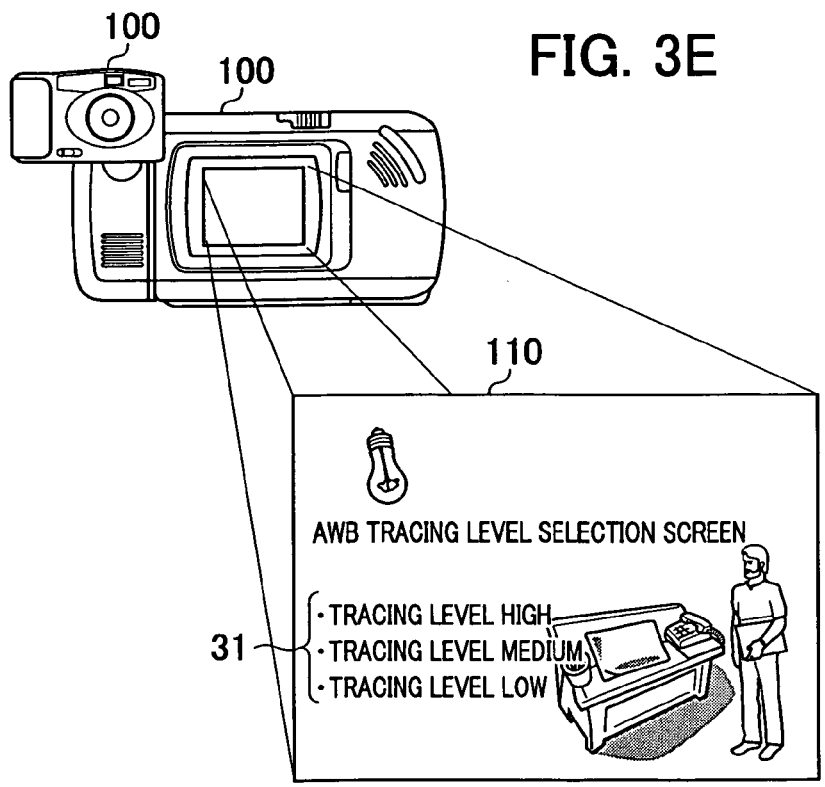

IMAGE PICKUP APPARATUS AND METHOD, RECORDING MEDIUM, AND PROGRAM PROVIDING USER SELECTED HUE AND WHITE BALANCE SETTINGS

BACKGROUND OF THE INVENTION

1. Field of the Invention

The present invention relates to an image pickup apparatus equipped with an imaging element having a plurality of types of color filters and with a hue setting feature for processing image signals, an image pickup method, and a recording medium and a program therefor.

2. Description of the Related Art

The following will describe an example in which a user sets a hue in an image pickup apparatus. The example relates to a setting method for white balancing (hereinafter referred to as "WB") in a digital camera.

In a conventional digital camera, the basic setting modes selected by a user to correct WB are an automatic white balancing (hereinafter referred to as "AWB") mode and a manual mode. When the AWB mode is set, a light source or a color temperature is automatically determined to correct the WB accordingly. When the manual mode is set, a light source, such as an electric bulb or a fluorescent lamp, and a color temperature are specified to perform a predetermined WB. The manual mode is suited for a case where it is difficult to automatically determine a light source or a case where different color temperatures are to be set.

The aforementioned AWB will now be described. There are two techniques for accomplishing automatic WB according to color temperature changes. In a first technique, a region that should show an achromatic color is determined from image data (hereinafter referred to as "the determination of achromatic color"), then the WB is performed to make the determined region achromatic. According to a second technique, the image signals of the overall image data are averaged for each color component, and the mean values are used to accomplish the WB. To determine achromatic colors, a region that should look achromatic is defined as an achromatic color determining range on a predetermined hue plane, then the region that should show an achromatic color is determined by determining whether each region is within a defined chromatic color extraction range. The hue plane is a coordinate plane in which, for example, the axis of ordinate indicates the assessment values of changes in hue toward green from magenta via an achromatic color, while the axis of abscissa indicates the assessment values of changes in color temperature. The hue plane plots color temperatures and hues of diverse light sources. The hue plane will be explained in more detail hereinafter.

The first technique described above is effective when the region of a substance or object that should look achromatic (hereinafter referred to simply as "the range") in image data in video signals obtained from an imaging element or the like is sufficiently large. This technique is disadvantageous, however, in that it is difficult to accurately perform WB if there is no region of a substance or object that should show an achromatic color or if the region is extremely small.

Even if a sufficiently large region of the substance that should look achromatic can be extracted, erroneous extraction of an achromatic color may result in the case of, for example, an achromatic color at a low color temperature and a flesh color at a high color temperature, or an achromatic color at a high color temperature and blue or the like at a low color temperature. In these cases, achromatic color extraction results that are similar to each other are provided. Especially when a wider achromatic color determining range is set, the AWB can be accomplished for a wider variety of light sources, while on the other hand, more determination errors may result in cases where similar achromatic color determination results are obtained.

For instance, an achromatic fluorescent lamp has more green components than a sunlight light source. Hence, for most fluorescent lamps, AWB is accomplished by making a setting to provide an extended tracing range toward green, i.e., an extended achromatic color determining range, on a hue plane. On the other hand, erroneous determination results in the case of a fluorescent lamp against lawn or the like of a pale color, thus preventing accurate WB adjustment. If, however, the tracing range is narrowed, then the types of light sources that can be covered by tracing will be inconveniently limited.

According to the second technique, the color components in image data are integrated, and the integrated value provides the achromatic color. This approach poses the following problem. When shooting a scene in which a particular color is dominant, e.g., a sunset scene, it is undesirably determined that the integrated value indicates an achromatic color, whereas the mean value determined by integration does not indicate an achromatic color. This results in a serious determination error.

There have been proposed a third technique that combines the first technique and the second technique discussed above, and a fourth technique in which the information regarding the brightness of an object is separately used to estimate the color temperature of a light source.

A proposed image pickup apparatus, for example, has a detector for detecting the brightness of an object, a limiter for limiting the white balancing range for at least an object of a low color temperature, and a balancing range changer for changing the limited white balancing range according to the outputs of the detector so as to expand the range when an object is dark. More specifically, if an object is relatively bright, then it is presumed that the user is likely to be outdoors and the white balancing for an outdoor sunlight light source is effected. Each time an object grows darker, cloudiness or shade is added to the AWB tracing range (achromatic color determining range), and the object grows further darker, then indoor light sources, such as electric bulbs and fluorescent lamps, are added to the AWB tracing range. Using these techniques makes it possible to automatically adjust white balance to obtain hues matched to human sense based on remembered/stored colors and/or experiences, according to shooting circumstances.

Although the above third and fourth techniques solve the problems with respect to the first and second techniques, to a certain extent, they are not fundamental solutions, because they are not capable of accurately determining light sources. More specifically, the techniques are effective within a range of light sources and environments that have been assumed beforehand, but proper WB cannot be accomplished when light sources and/or environments are out of the expected range. For instance, AWB may not be properly effected under an extremely bright bulb light source or when shooting a pale green object in a dark place.

There is a case where WB should fully trace the changes of light sources; on the other hand, there is a case where capturing the atmosphere of a scene is more important than making WB fully trace light source changes. The selection between these two cases depends on the taste or intention of a shooter. For example, a depiction with a remaining reddish tint and a depiction with full WB effected under a bulb light source are both frequently used, depending on shooting scenes. It is therefore difficult to decide on an optimum tracing range of expected light sources and the optimum tracing range also depends on the shooter'intention. This poses a problem in that it is extremely difficult to determine standard optimum WB settings for multiple users. Furthermore, conventionally it has been impossible for users to visually recognize the WB settings in terms of colors.

When setting a color shade or a hue of an image signal, in an RGB space, for example, a user cannot visually identify RGB set values in setting each of the RGB independent parameters. It is therefore difficult to determine optimum color balance. Furthermore, when checking the color shade of an image to be shot displayed in a histogram, the entire color balance cannot be visually perceived by merely observing the respective independent levels of the RGB.

SUMMARY OF THE INVENTION

The present invention has been made in consideration of the problems described above, and it is an object of the present invention to provide an image pickup apparatus and method that enable a user to visually and easily accomplish quick optimum settings of hues of images to be shot, and also to enable the user to perform development processing, and a recording medium and a software therefor.

To this end, an image pickup apparatus (and method) according to one aspect of the present invention enables a user to make operational settings for image processing for an image to be shot from a hue chart displayed on the image pickup apparatus. This arrangement enables a user to visually set hues with ease by displaying a hue chart.

An image pickup apparatus (and method) according to another aspect of the present invention displays color distribution of an image to be shot on a hue chart by a display unit of the image pickup apparatus. This arrangement enables a user to visually perform with ease the color distribution of an image to be shot by displaying a hue chart.

An image pickup apparatus (and method) according to yet another embodiment of the present invention displays a setting screen showing the tracing level of white balance to allow a user to set an arbitrary tracing level, select an achromatic color determining parameters corresponding to the set tracing level, and carry out WB on an image signal using the selected achromatic color determining parameters.

This arrangement advantageously enables a user to visually set with ease an achromatic color determining range for WB. Moreover, the user is prompted to set an arbitrary tracing level, and the WB is effected using the tracing range parameters based on the tracing level set by the user, thus enabling the user to select optimum setting for the WB. With this arrangement, the user can arbitrarily set the WB tracing range so as to accomplish optimum WB setting to suit the user's taste or intention, or according to the place where the user is located.

According to yet another aspect of the present invention, a computer-readable recording medium is provided. Recorded in the recording medium is a program for carrying out display processing in the aforementioned image pickup apparatuses (and methods).

According to a further aspect of the present invention, a program for the aforementioned image pickup apparatuses is provided.

Thus, the image pickup apparatuses and methods according to the embodiments described above enable a user to set optimum color shades according to the taste or intention of the user, or according to the place where the user is located, set the achromatic color determining range for WB, or check the color distribution of an image to be shot, by displaying a hue chart on the image pickup apparatus.

Other features and advantages of the present invention will become apparent from the following description of the preferred embodiments taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate preferred embodiments of the present invention and, together with the written description, serve to explain the principles of the present invention.

FIGS. 3A to 3E show examples of AWB tracing level selection screens displayed on the image pickup apparatus shown in FIG. 1.

DESCRIPTION OF THE PREFERRED EMBODIMENTS

Preferred embodiments of the present invention will be described in detail in accordance with the accompanying drawings.

First Embodiment

Selecting Preset Tracing Ranges

First, the schematic construction of an image pickup apparatus according to one embodiment of the present invention will be explained.

Figure 1:
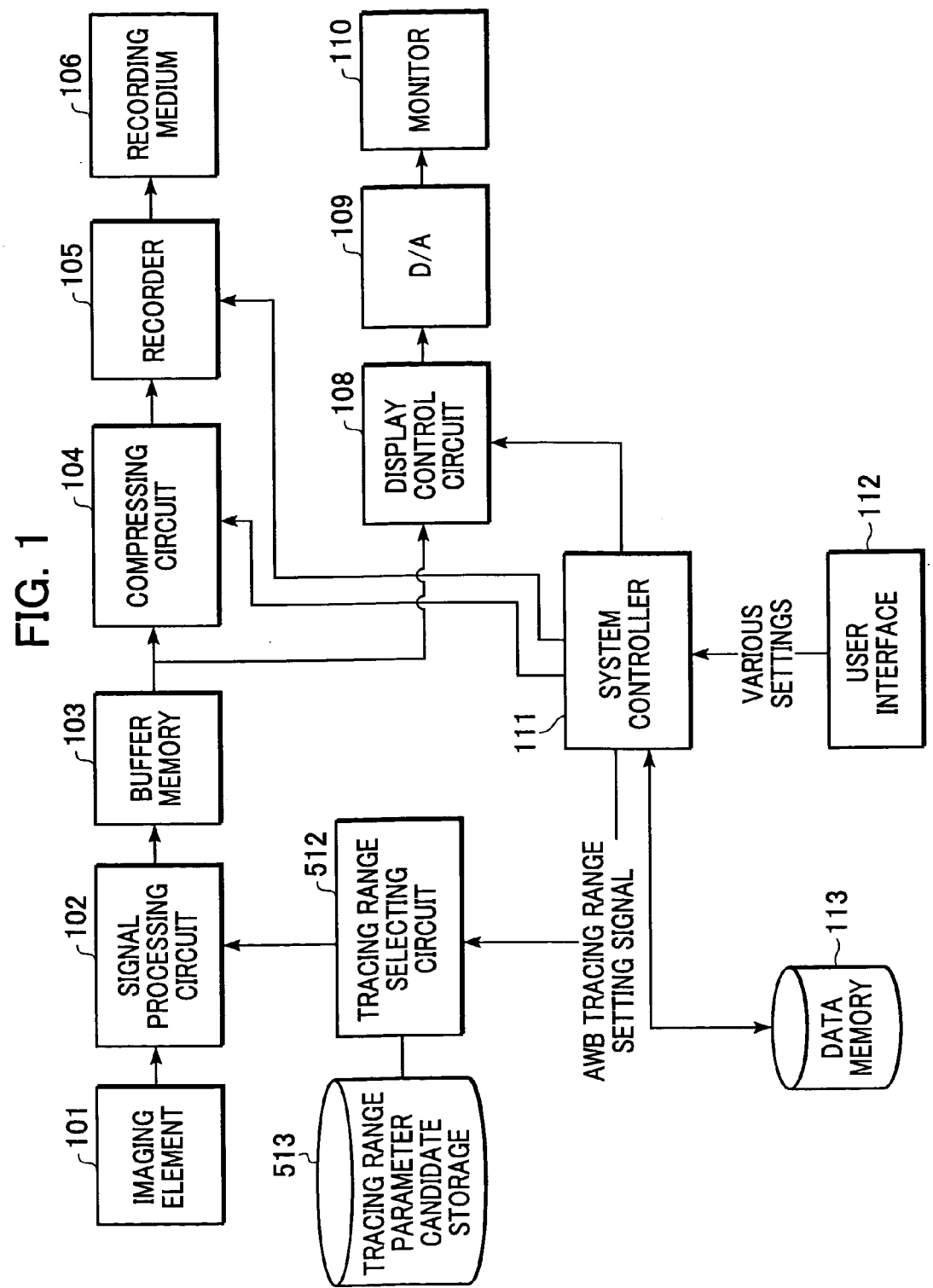
FIG. 1 is a block diagram showing the schematic construction of an image pickup apparatus according to one embodiment of the present invention.

FIG. 1 is a block diagram showing the schematic construction of an image pickup apparatus according to a first embodiment of the present invention. An image pickup apparatus shown in FIG. 1 is specifically a digital still camera or the like. The image pickup apparatus uses an imaging element having a plurality of color filters and therefore includes an automatic white balancing (hereinafter referred to as "AWB") feature for automatically adjusting changes in color tone caused by different light sources. The following will explain the internal construction of the image pickup apparatus.

Figure 2:
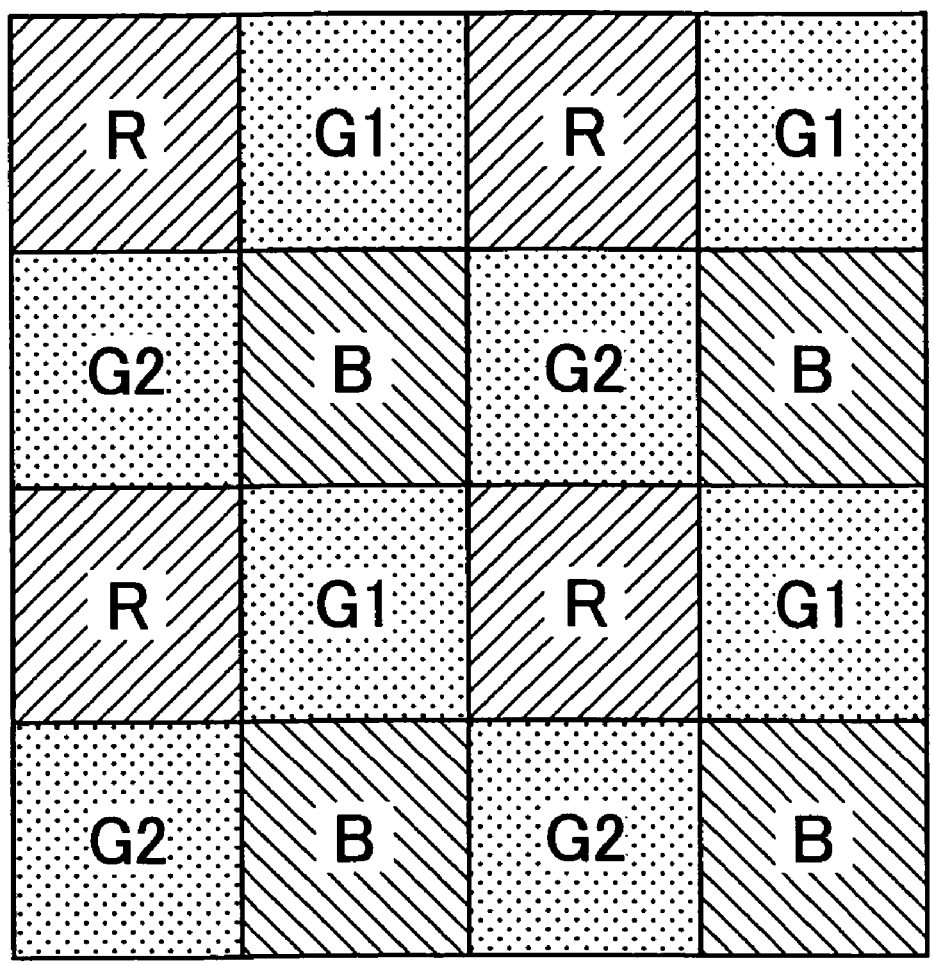
FIG. 2 is a diagram showing an example of the color filter array of an imaging element shown in FIG. 1.

An imaging element 101 is, for example, a charge coupled device (CCD) sensor, a CMOS sensor or the like, and has a color filter on each pixel. FIG. 2 shows an example of the color filter array of the imaging element 101. Referring to FIG. 2, the color filters of the imaging element 101 are of the primary-color Bayer filter array type, in which a line of R, G1, R, G1, and so on (a line of thereinafter referred to as an "R line"), is followed by a line of G2, B, G2, B, and so on (hereinafter referred to as a "B line"); thereafter, the R line and the B line sequences are repeated. With this arrangement, the imaging element 101 outputs image signals (digital signals) based on the quantity of light that passes through the color filters. If necessary, the imaging element 101 is provided with an A/D converting circuit to issue image signals, which are digital signals.

A signal processing circuit 102 processes the image signals output from the imaging element 101 to generate image data. The signal processing circuit 102 also has a function of carrying out AWB processing. A detailed configuration of the signal processing circuit 102 will be discussed below. A buffer memory 103 stores the image data output from the signal processing circuit 102. A compressing circuit 104 reads image data from the buffer memory 103 and outputs compressed image data according to a predetermined compression method. The predetermined compression method may be, for example, the joint photographic experts group (JPEG) method. In this case, the compressing circuit 104 outputs a JPEG image formed of the compressed image data.

To record an image, compressed image data output from the compressing circuit 104 is processed by a recorder 105 to record it in a recording medium 106. If no image recording is performed, as in an electric view finder (EVF) mode or the like, then the image data stored in the buffer memory 103 is supplied to a display control circuit 108. The display control circuit 108 converts the image data to make it compatible with a monitor display unit. A digital-to-analog (D/A) converter 109 outputs image signals (analog signals) obtained by subjecting the digital image signals for the monitor display unit received from the display control circuit 108 to D/A conversion. A monitor 110 displays images based on the image signals received from the D/A converter 109.

A system controller 111 controls operations of the compressing circuit 104, the recorder 105, the display control circuit 108 and a tracing range selecting circuit 512, which will be discussed later, and the flow of data within the image pickup apparatus. A user interface 112 transmits commands for changing various settings entered by a user operating the image pickup apparatus, or executing display processing or the like in the display control circuit 108, to the system controller 111. A data memory 113 stores programs that can be read and executed by the system controller 111, and various types of data for processing by the system controller 111.

The tracing range selecting circuit 512 selects tracing range parameters that define the achromatic color determining range in a hue chart, which will be described later. The tracing range parameters selected by the tracing range selecting circuit 512 also serve as parameters defining the tracing range for the AWB. For instance, the tracing range parameters for defining a wider achromatic color determining range on a hue plane indicate an extended range set for carrying out the AWB that is compatible with a variety of light sources. Conversely, the tracing range parameters for defining a narrower achromatic color determining range indicate a smaller range set for carrying out the AWB that is compatible with a limited types of light sources.

The hue map in this case refers to a hue plane that two-dimensionally maps the colors represented in a predetermined color space, or a color reproduction region, so as to provide visual presentation. One axis in the hue chart indicates the direction of color temperatures and the other axis (orthogonal to the former axis) indicates the directions of green and magenta. The hue chart alternatively may use multi-dimensional representation in a color space, and the axial parameters may be in R-B directions rather than the color temperature directions. In this embodiment, the hue plane will be used.

A tracing range parameter candidate storage 513 stores the candidates of tracing range parameters decided by the tracing range selecting circuit 512. The tracing range selecting circuit 512 and the tracing range parameter candidate storage 513 will be discussed in more detail later.

The arrangement described above enables the image pickup apparatus to record white-balanced compressed image data in the recording medium 106 or to display white-balanced images on the monitor 110. The image pickup apparatus also is capable of setting a predetermined tracing range and performing AWB based on the set tracing range.

Figure 3A:
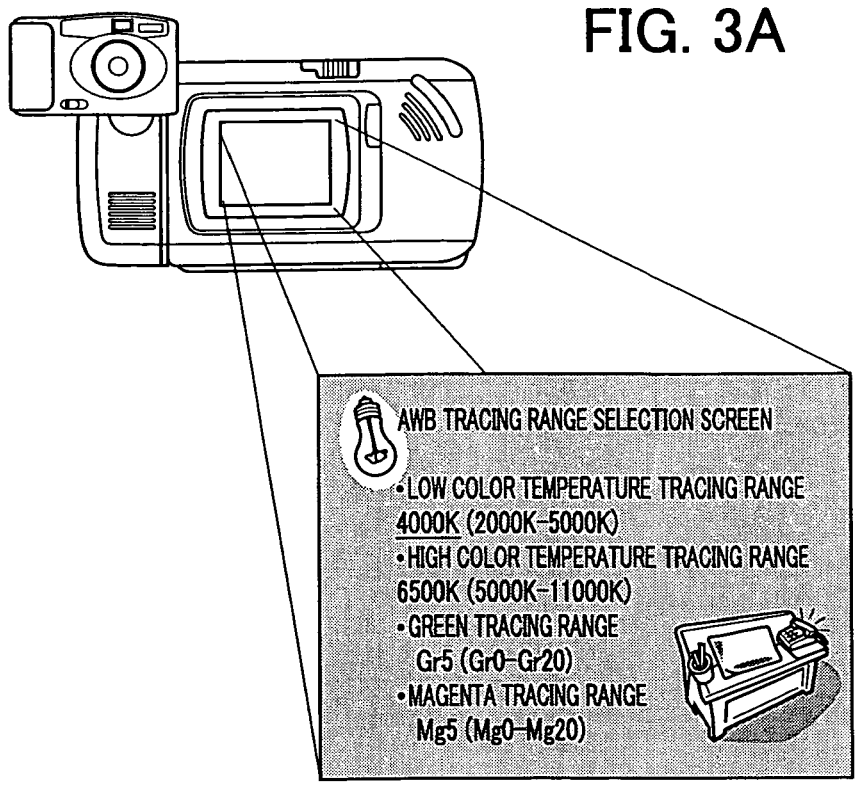
Figure 3B:
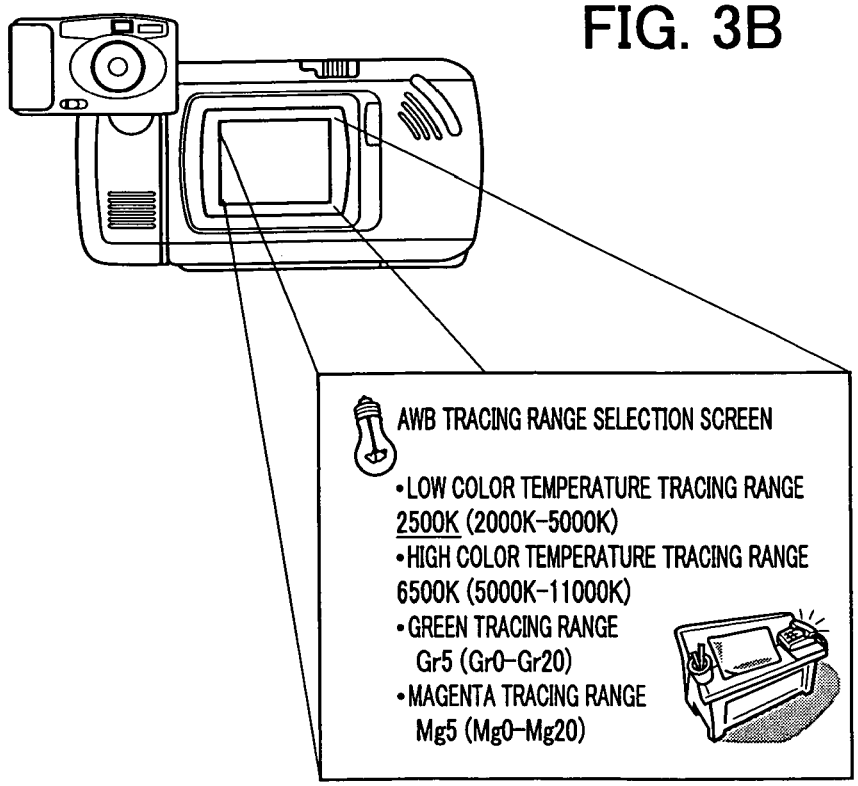
Figure 3C:
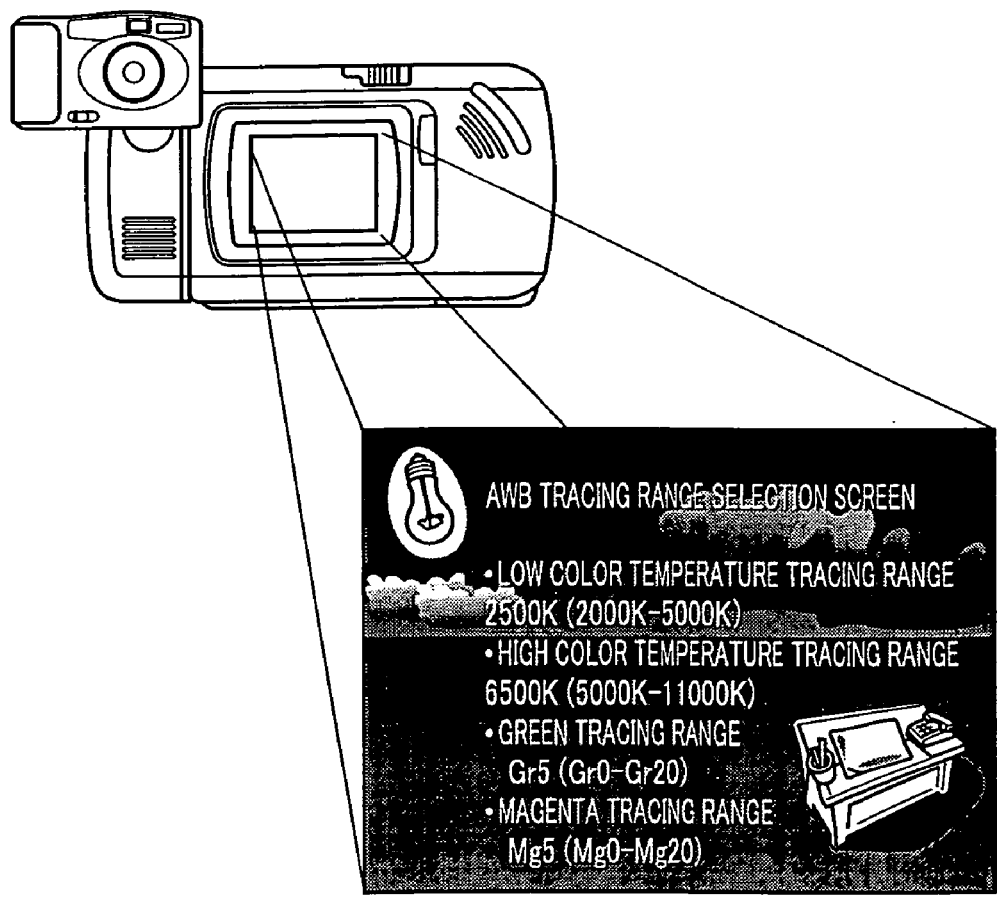

The processing for setting the AWB in the above image pickup apparatus will now be explained. First, a description will be given of the setting of the tracing range for the WB by the user interface 112. FIGS. 3A to 3E shows examples of AWB tracing range selection screens displayed on the image pickup apparatus shown in FIG. 1. Referring to FIGS. 3A through 3C, the screen displayed on the monitor 110 allows an AWB tracing range to be set. On this screen, a user can select a desired tracing range from among four choices of tracing ranges, namely, high color temperature tracing range, low color temperature tracing range, green tracing range, and magenta tracing range. More specifically, if the image pickup apparatus has a cursor or selection buttons, which are not shown, then the user can specify the desired tracing range by using the cursor or the selection buttons. If the monitor 110 has a touch panel, then the user can select the desired tracing range through the touch panel on the screen. The aforesaid user interface is implemented by the processing carried out by the user interface 112.

FIGS. 3A to 3C display the changes in the color tones of the images displayed on the monitor 110 on the basis of a selected tracing range, in addition to displaying the tracing range setting screen. It is assumed that, in FIGS. 3A to 3C, the background of an object is white, and the light source is an electric bulb. Referring to FIG. 3A, the low color temperature tracing range is set to 4000K, so that the electric bulb light source is not included in the tracing range. As a result, the WB tracing is not carried out much under an electric bulb light source, thus displaying the image, which is a background with a reddish color tone. FIG. 3B shows an example wherein the low color temperature tracing range is set to 2500K and the WB tracing is fully performed, thus displaying the image of a white background. For the tracing ranges in the green and magenta directions, there are green adjustment filters and magenta adjustment filters for correcting the greenish tint due to a fluorescent lamp when shooting with a positive film, the filters being numbered on the basis of correction levels. In this embodiment, the deviations from black radiation that correspond to the correction levels are indicated by numeral values, and the numeral values are specified to set the tracing ranges in the green/magenta directions.

Figure 4A:
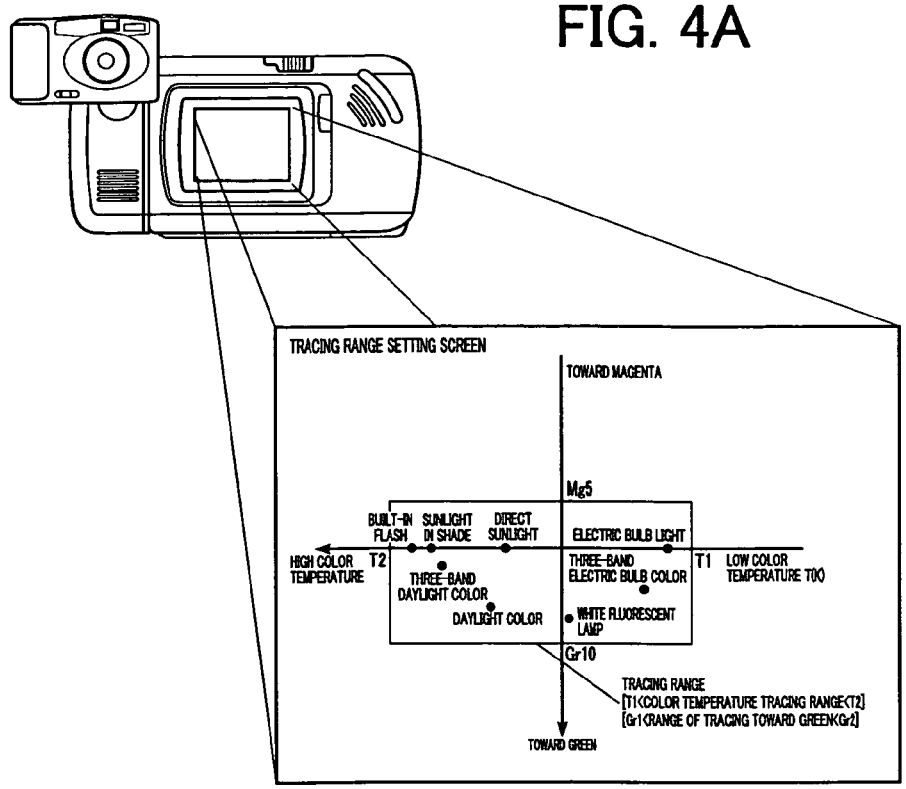
FIGS. 4A to 4D show examples of hue planes and achromatic color determining ranges based on tracing levels according to the present embodiment.
Figure 4B:
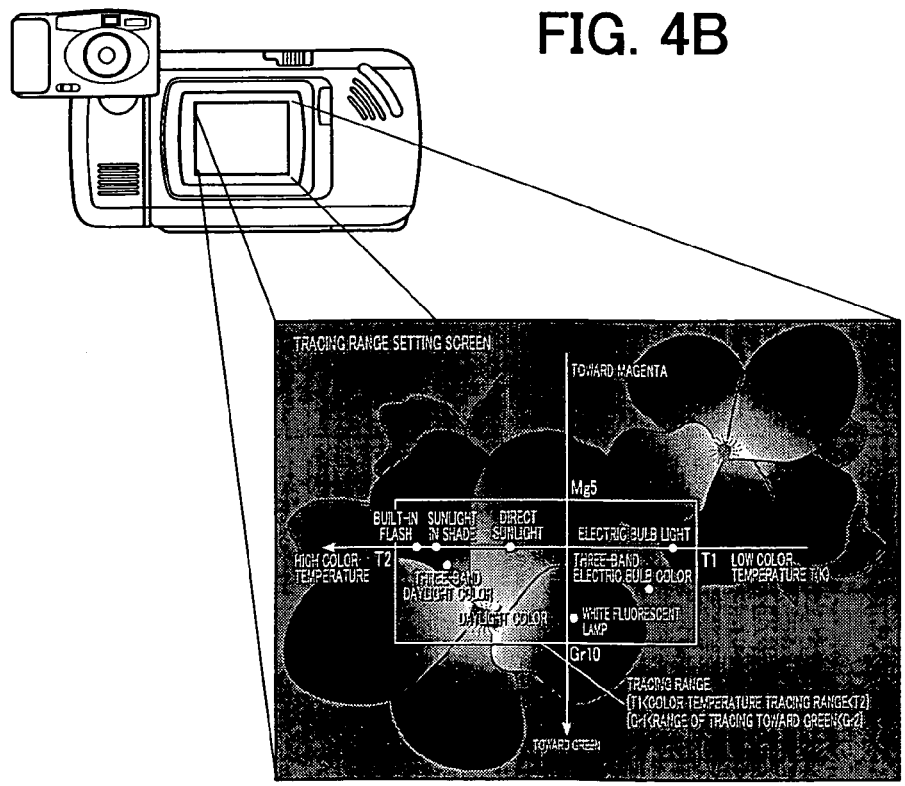
Figure 4C:
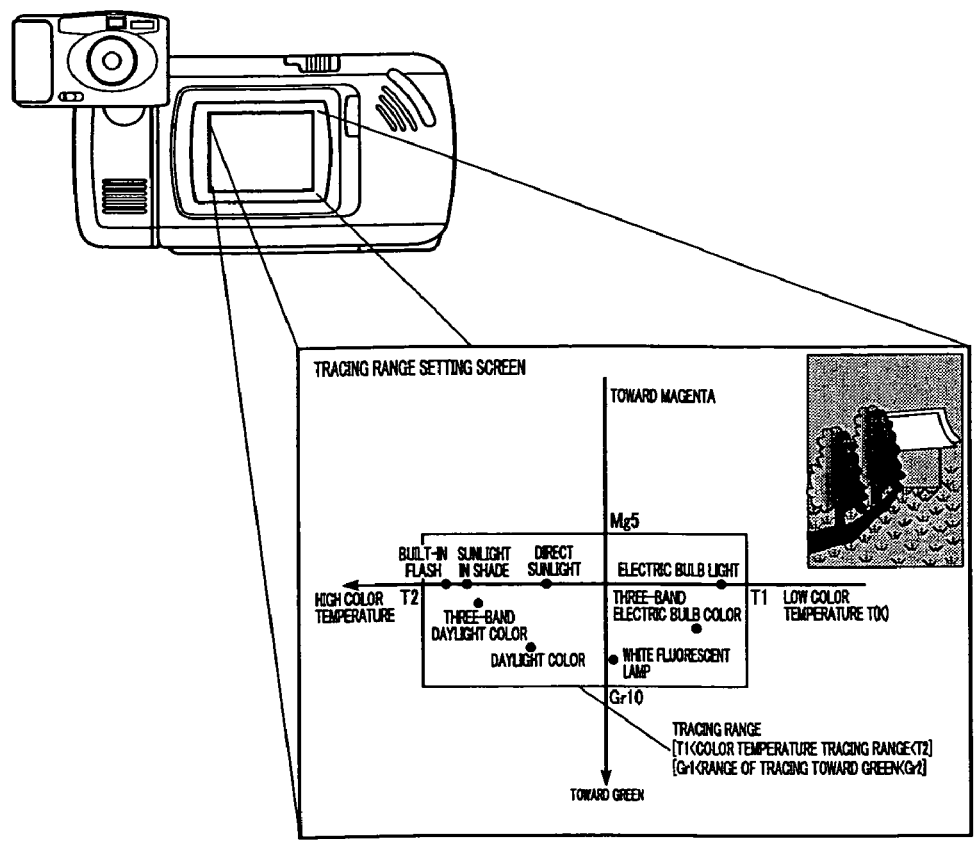

Alternatively, the tracing ranges may be set on a hue chart by displaying the hue chart on the user interface screen. FIGS. 4A to 4C show, for example, the tracing ranges, which have been specified by the numeral values in FIGS. 3A, 3B and 3C, on the user interface screen. In the hue planes shown in FIGS. 4A, 4B and 4C, the axis of ordinates indicates the changes in the hue from green to magenta via white, while the axis of abscissa indicates the changes in color temperature. The names of light sources are shown on the hue planes of FIGS. 4A to 4C.

Referring to FIG. 4A, when the hue chart is independently displayed on the user interface screen, then an operating switch (not shown) is used to switch between an image to be shot and the user interface screen in FIG. 4A, so as to check changes in the image to be shot. Alternatively, the hue chart may be superimposed on the image to be shot, as shown in FIG. 4B. Further alternatively, the image to be shot may be displayed together with the hue chart, as shown in FIG. 4C, so as to reflect the changes in the set tracing range on the image to be shot. This enables the user to check the changes in the hue of the image to be shot on the basis of the set tracing ranges in real-time.

Figure 5A:
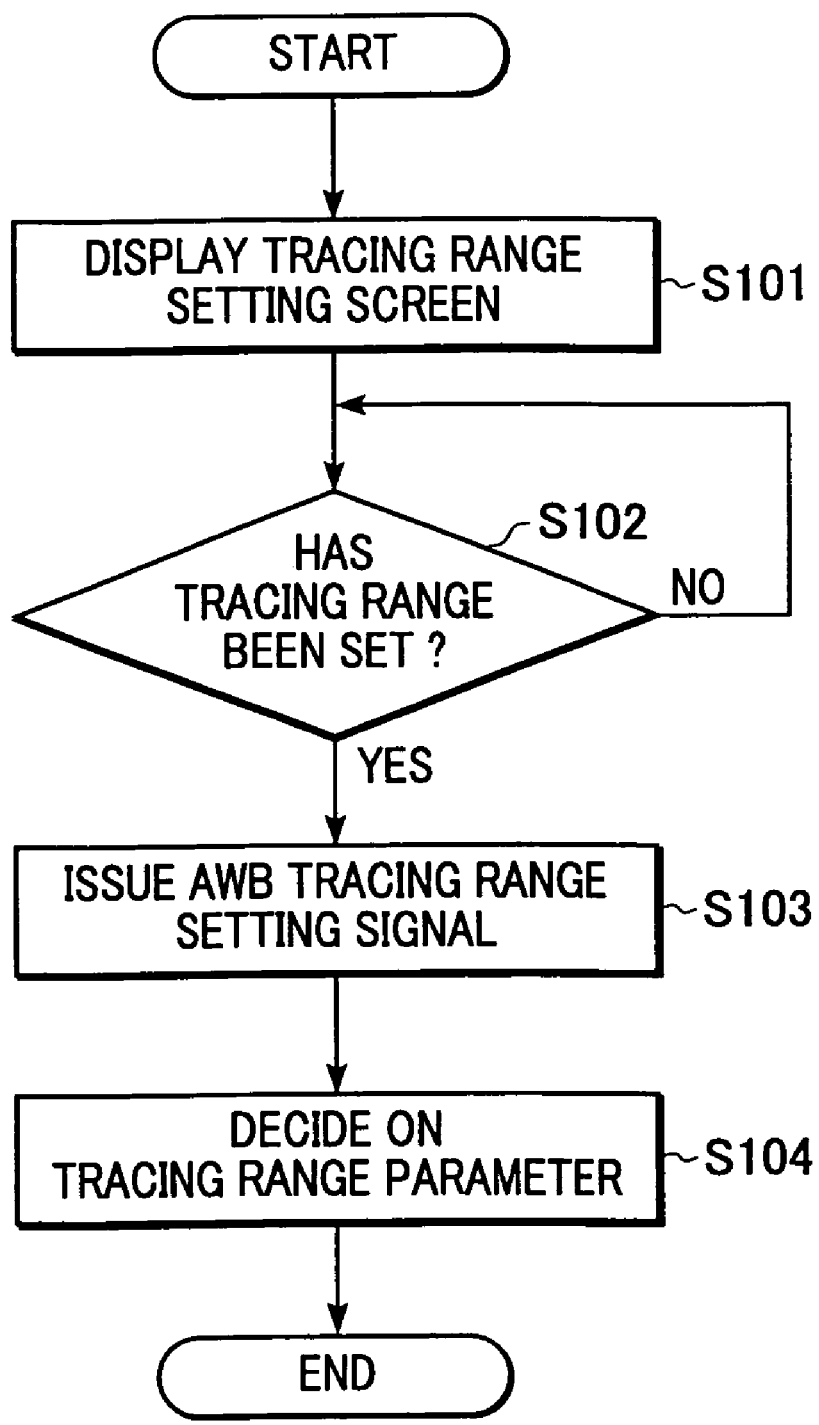
FIGS. 5A and 5B are flowcharts showing processing steps for determining tracing range parameters in the image pickup apparatus shown in FIG. 1.

A description will now be given of an operation for selecting the tracing range parameters in the image pickup apparatus when the user sets an arbitrary tracing range on the screen for selecting the AWB tracing level shown in FIGS. 3A to 3E discussed above. FIG. 5A is a flowchart illustrating processing steps carried out for selecting the tracing range parameters in the image pickup apparatus shown in FIG. 1. The operation of the image pickup apparatus shown in FIG. 5A is started when the user operates the user interface 112 or performs a similar operation.

First, the moment the user operates the user interface 112, the screen for selecting the AWB tracing range, e.g., as variously shown in FIGS. 3A to 3C, is displayed on the monitor 110 (step S101). At this time, if an image is being picked up, then the EVF display of the image being shot is switched to the selection screen. This prompts the user to set the tracing range. Then, if the tracing range has not been set on the selection screen shown in FIG. 3 (NO in step S102), then the display on the selection screen is maintained until the tracing range is set (loop processing). If the tracing range is set on the setting screen shown in FIG. 3 (YES in step S102), then the setting information regarding the set tracing range is transmitted to the system controller 111 through the user interface 112. Next, the system controller 111 outputs the AWB tracing range setting signal based on the received tracing range to the tracing range selecting circuit 512 (step S103).

Subsequently, the tracing range selecting circuit 512 refers to the tracing range parameter candidate storage 513 for tracing range parameters to select tracing range parameters based on the received AWB tracing range setting signal and sends the selected tracing range parameters to the signal processing circuit 102 (step S104). This allows the image pickup apparatus to set the tracing range parameters for the tracing range set by the user on the AWB tracing range setting screen. The image pickup apparatus can thus effect the AWB using the tracing range parameters for the tracing range set by the user.

The internal construction of the image pickup apparatus discussed above is just one example of the preferred embodiment. Any other construction may be applied as long as the imaging element 101 is equipped with a plurality of types of color filters and performs the feature of AWB described above. Furthermore, in the above embodiment, there are four different tracing ranges that can be set on achromatic color determining area; however, any other number of different tracing ranges may be set. The sizes and shapes of the achromatic color determining regions on the hue planes for the tracing ranges are not limited to those in the above embodiment; the achromatic color determining ranges may have various other sizes or shapes.

Figure 6:
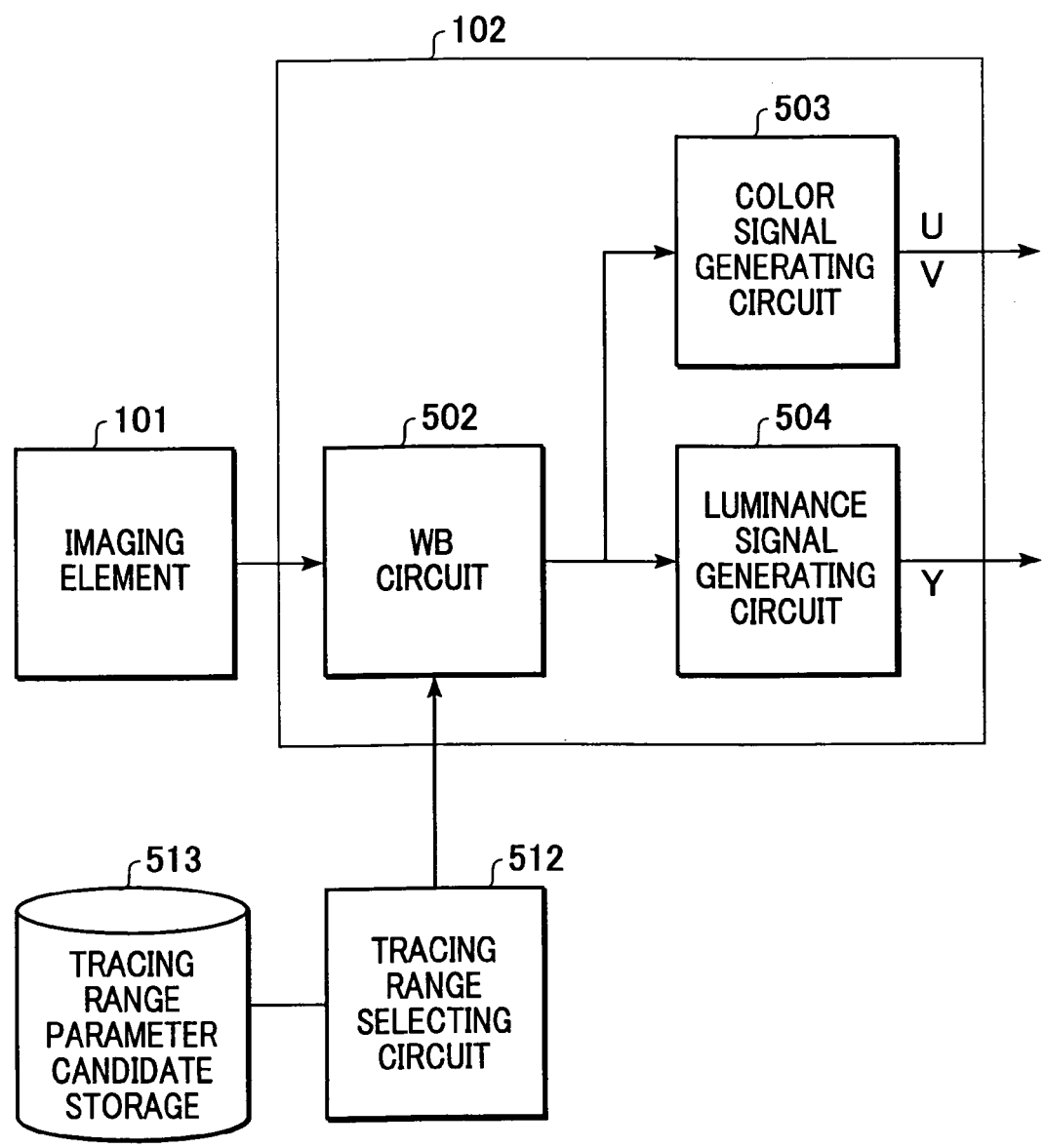
FIG. 6 is a block diagram showing an example of the internal configuration of the signal processing circuit shown in FIG. 1.

The WB in the image pickup apparatus described above will now be explained in detail. First, the internal configuration of the signal processing circuit 102 shown in FIG. 1 will be explained. FIG. 6 illustrates an example of the internal configuration of the signal processing circuit 102 shown in FIG. 1. Referring to FIG. 6, a WB circuit 502 receives image signals from the imaging element 101 and carries out the WB so as to make an object that looks white to human eyes also look white in an image output by the image pickup apparatus. At this time, the WB circuit 502 carries out the WB based on the tracing range parameters received from the tracing range selecting circuit 512. Then, the color signal generating circuit 503 generates color-difference signals U and V based on the image data that has been subjected to the WB, and outputs the generated signals U and V. A luminance signal generating circuit 504 generates a luminance signal Y based on the image data that has been subjected to the WB, and outputs the generated luminance signal Y. As described above, the signal processing circuit 102 is constructed of the WB circuit 502, the color signal generating circuit 503 and the luminance signal generating circuit 504. Thus, the signal processing circuit 102 can output YUV type image data that has been subjected to the WB based on the tracing range parameters.

Figure 7:
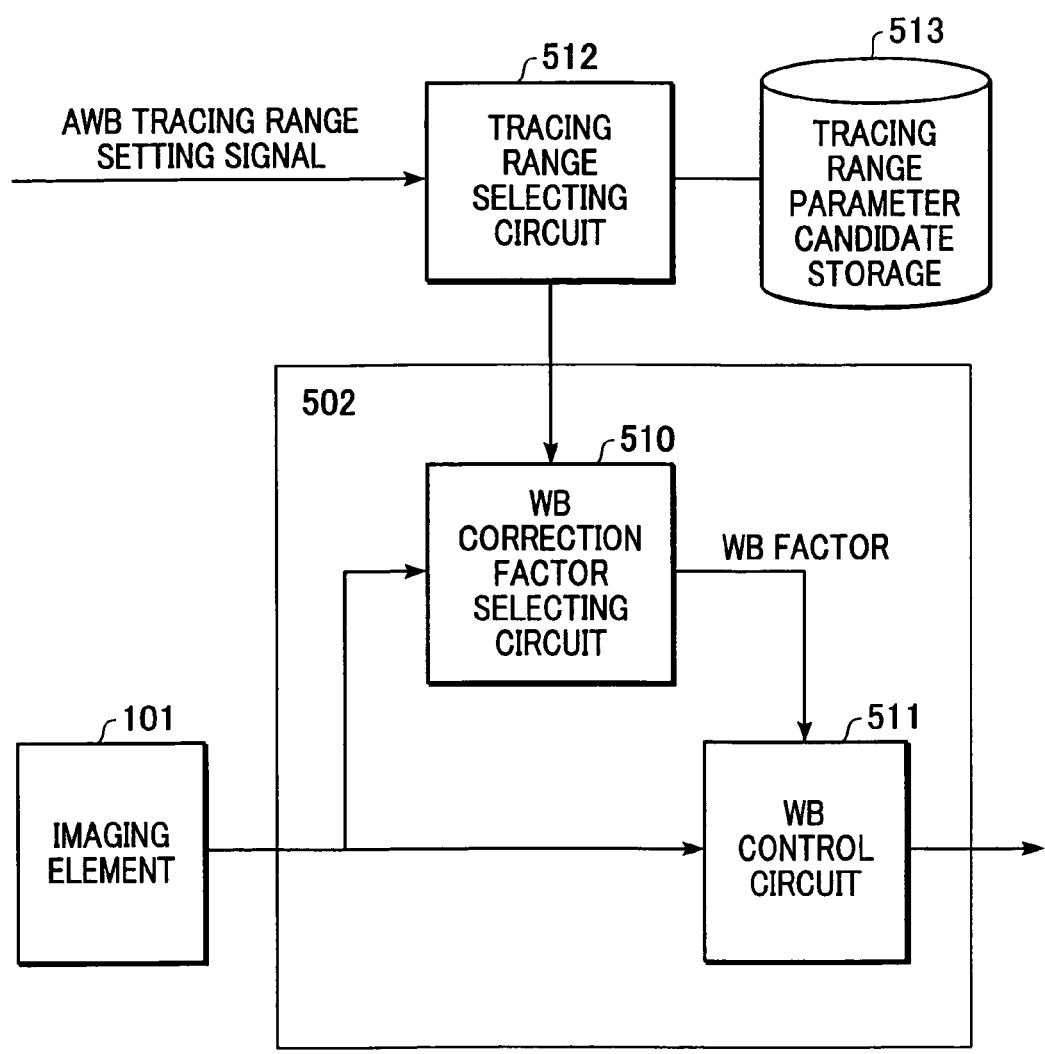
FIG. 7 is a detailed block diagram of a WB circuit shown in FIG. 6.

The detailed configuration of the WB circuit 502 shown in FIG. 6 will now be described. FIG. 7 shows the detailed configuration of the WB circuit 502 shown in FIG. 6. Referring to FIG. 7, a WB correction factor selecting circuit 510 calculates the WB correction factor on the basis of the image signals issued by the imaging element 101 and the tracing range parameters received from the tracing range selecting circuit 512, and outputs the calculated factor. A WB control circuit 511 multiplies the image signals output from the imaging element 101 by the WB correction factors output from the WB correction factor selecting circuit 510 for respective color signals so as to output image data, which has undergone the WB. As described above, the WB circuit 502 is formed of the WB correction factor selecting circuit 510 and the WB control circuit 511. This arrangement enables the WB circuit 502 to output the image data that has been subjected to the WB adjustment according to the tracing range parameters on the basis of the image signals from the imaging element 101. The WB-adjusted image data is output to the monitor 110 for the user to check the images displayed thereon.

The tracing range parameters described above will now be explained. In this embodiment, the achromatic color determining range on a hue plane is changed according to the tracing range parameter values set by the user. The following will show a specific example of the hue plane and the achromatic color determining range.

On the axis of ordinates of the hue planes shown in FIGS. 4A to 4D, the changes in the hue from green to magenta via white can be denoted by a color assessment value Ey.

Similarly, on the axis of abscissa of the hue planes, the changes in color temperature can be denoted by a color assessment value Ex. If the color filters of the imaging element 101 are laid out in the primary color Bayer filter array shown in FIG. 2, then the color assessment values Ex and Ey can be defined by the expressions shown below:

$$Ex=(R-B)/Y$$

$$Ey=((R+B)/2-(G1+G2)/2)/Y$$

where Y=0.3R+0.59G (=G1 or G2)+0.11B. R, G1, G2 and B in the above expression correspond to the color filters (R, G1, G2, B) shown in FIG. 2.

Figure 8:
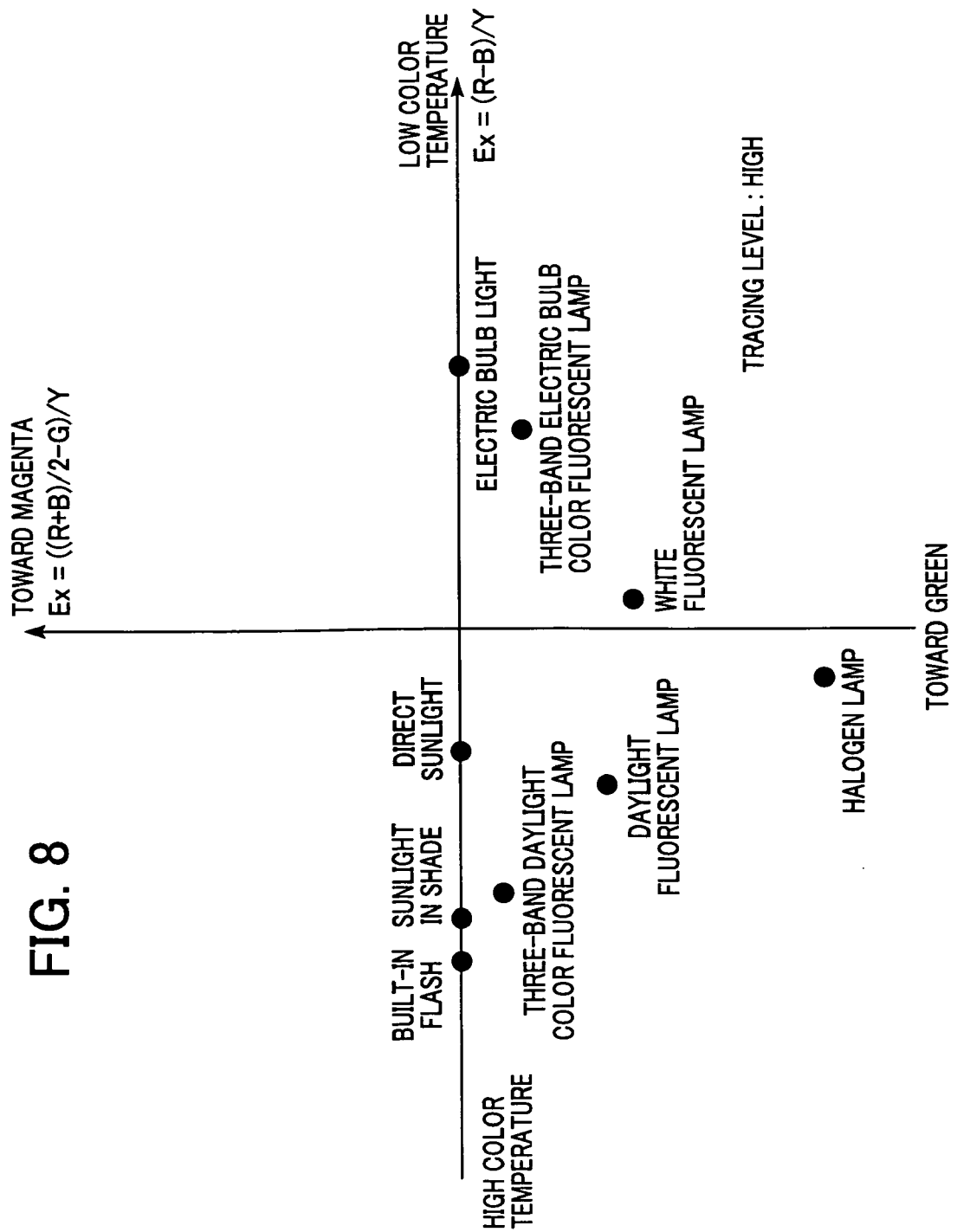
FIG. 8 is a diagram showing the coordinates of hue planes and a plurality of types of light sources, with color assessment values Ex and Ey being on the axis of abscissa and the axis of ordinates.

FIG. 8 shows the hue plane and the coordinates of a plurality of different light sources, the color assessment values Ex and Ey being indicated on the axis of abscissa and the axis of ordinates, respectively. The coordinates for the plural different light sources are determined by, for example, shooting white points at the color temperatures of the plural different light sources that exist in the natural world, and the color assessment values Ex and Ey at each color temperature are determined.

On the hue plane with the aforementioned color assessment values Ex and Ey taken on the axis of abscissa and the axis of ordinates, respectively, the aforementioned achromatic color determining ranges are set on the basis of the tracing level parameters. As described above, the coordinates of the plural different light sources on the hue plane are plotted, so that the types of light sources that can be covered by the WB tracing provided by a set achromatic color determining range can be known. Thus, the tracing range parameters in this embodiment specify the color assessment values Ex and Ey for defining the achromatic color determining range in the hue plane.

A description will now be given of an example of a method whereby the aforesaid WB correction factor selecting circuit 510 selects WB correction factors.

(1) First, the system controller 111 outputs the AWB tracing range signal based on the tracing range set by a user to the tracing range selecting circuit 512. Based on the received AWB tracing range signal, the tracing range selecting circuit 512 selects tracing range parameters from the tracing range parameter candidate storage 513 and supplies the selected parameters to the WB correction factor selecting circuit 510 to set the parameters therein. Based on the set tracing range parameters, the WB correction factor selecting circuit 510 sets the achromatic color determining range on a hue plane. This completes the setting of the achromatic color determining range based on the tracing range set by the user.

(2) The WB correction factor selecting circuit 510 divides up the image signal supplied from the imaging element 101 into a plurality of small regions (hereinafter referred to as "sample areas"). Each sample area refers to one region of an "m" number of regions obtained by dividing one screen into the "m" number of regions. The WB correction factor selecting circuit 510 calculates the color assessment values Ex and Ey using values obtained by averaging the R, G and B signals existing in each sample area by each pixel.

(3) Subsequently, the WB correction factor selecting circuit 510 determines whether the coordinates of the color assessment values Ex and Ey obtained at each sample point are included in a particular white determining range. This makes it possible to extract the sample point included in the achromatic color determining range set on the basis of the tracing range. The sample points will be required for determining the WB correction factor.

(4) If it is determined that the aforementioned color assessment values Ex and Ey are included in the white determining range of the hue plane, then the WB correction factor selecting circuit 510 adds, for each color, the R, G and B values output for each pixel from the sample point.

(5) Then, the WB correction factor selecting circuit 510 carries out the processing of (1) through (4) described above on all sample points on the screen.

(6) Subsequently, the WB correction factor selecting circuit 510 determines the gain for each color (each RGB) so that the mean values of the RGB signals added in step (4) above reach the same level, and takes the determined gain as the WB correction factor.

The method described above enables the WB correction factor selecting circuit 510 to determine the WB correction factor. In short, the image pickup apparatus changes the achromatic color determining range on the hue plane according to a set AWB tracing range so as to change the tracing range on the hue plane in the AWB processing.

According to the embodiment discussed above, the user can set any tracing range so as to effect the AWB to suit the intention of the user using the tracing range parameters based on the set tracing range.

Second Embodiment

Designating a Desired Tracing Range on a Hue Plance

In a second embodiment, a description will be given of a method for setting tracing range parameters, in which a hue chart including achromatic color and white color determining ranges is displayed on a monitor 110, and a user refers to a hue plane to set a desired achromatic color determining range on the displayed hue plane. The schematic construction of an image pickup apparatus is identical to that of the embodiment already discussed above, and the explanation will not be repeated. Only aspects that differ from the first embodiment will be described below.

Figure 9:
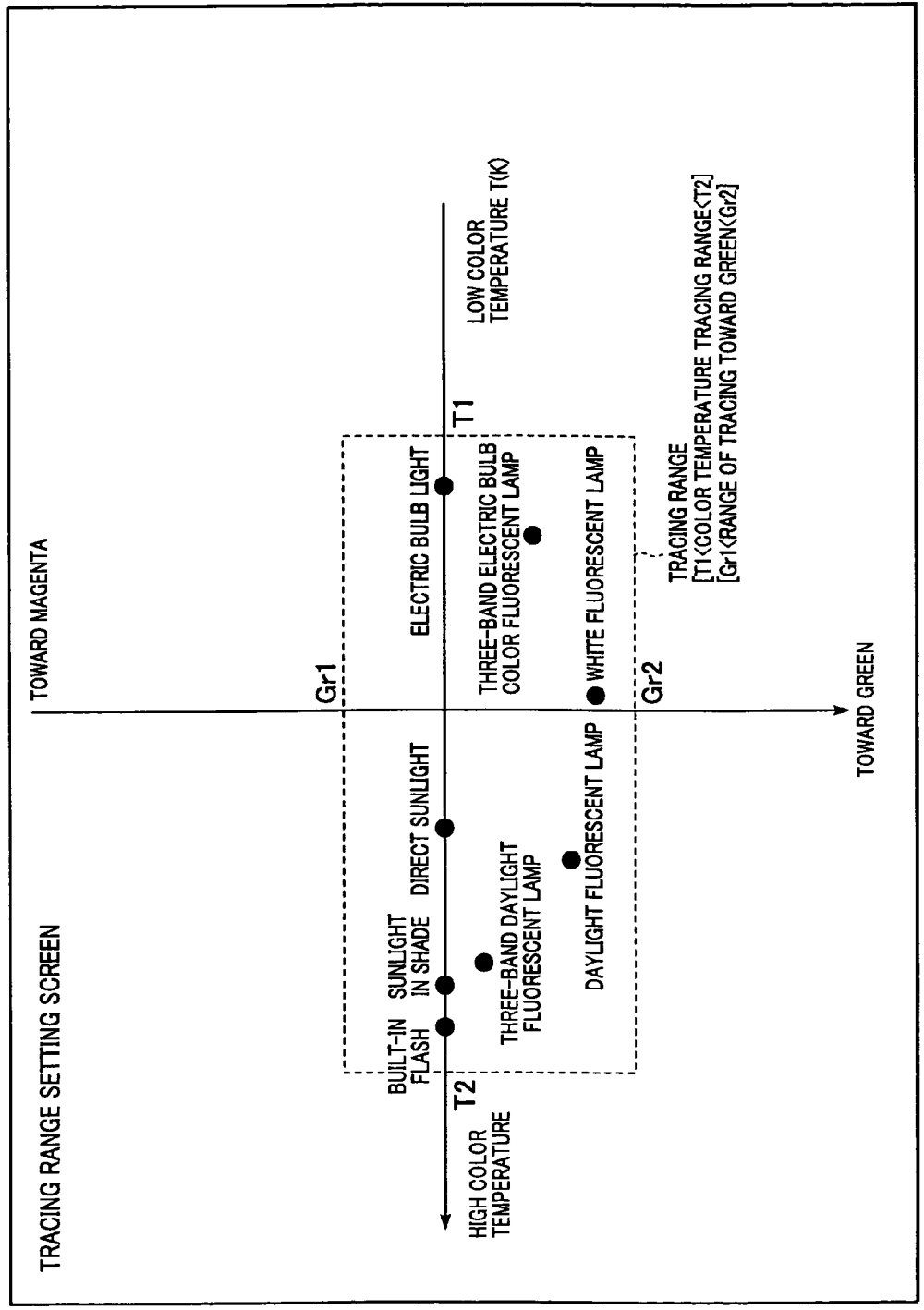
FIG. 9 is a chart illustrating the examples of tracing range parameters for setting a tracing range (achromatic color determining range) on a hue plane by a tracing range parameter selecting circuit.

First, by operating a user interface 112, the hue plane, as shown in FIG. 9, is displayed on the monitor 110. The hue plane allows a desired achromatic color determining range to be set. FIG. 9 shows an example of the AWB tracing range setting screen. The tracing range shown in FIG. 9 is set using the variables indicated below to define the four sides providing the upper or lower limit of the achromatic color determining range on the hue plane. More specifically, in the hue plane, the tracing range toward a lower color temperature is denoted by T1, the tracing range toward a higher temperature is denoted by T2, the tracing range toward magenta is denoted by Gr1 and the tracing range toward green is denoted by Gr2 to set achromatic color determining ranges. In FIG. 9, the names of various types of light sources are shown at the coordinates based on the color assessment values of the various types of light sources. The achromatic color determining ranges in the hue plane may alternatively be superimposed on the image to be shot, as illustrated in FIG. 4B. This enables the user to check the achromatic color determining range to be set and the resulting change in the hue of the image of interest in real-time.

When the user sets the achromatic color determining range on the hue plane shown in FIG. 9, the user interface 112 transmits setting information regarding the achromatic color determining range to a system controller 111. The system controller 111 then issues an AWB tracing range setting signal based on the setting information. Subsequently, the tracing range selecting circuit 512 designates the setting values, i.e., the color assessment values, of the aforementioned T1, T2, Gr1 and Gr2 on the basis of the received AWB tracing range setting signal. More specifically, the tracing range selecting circuit 512 decides the set values of T1, T2, Gr1 and Gr2 as the tracing range parameters. The processing thereafter is the same as that for the first embodiment, so that the explanation thereof will not be repeated.

The above image pickup apparatus enables a user to designate an achromatic color determining range on a hue plane so as to easily set a desired tracing range. Since the coordinates of various types of light sources are shown on the hue plane, it is possible to easily set the types of light sources to be covered for the tracing.

For instance, only the tracing range toward a higher color temperature can be changed by changing the value of the tracing range parameter T1 for setting the achromatic color determining range toward a higher color temperature. Similarly, only the tracing range toward a lower color temperature can be changed by changing the value of the tracing range parameter T2 for setting the achromatic color determining range toward a lower color temperature. Furthermore, changing the tracing range parameters Gr1 and Gr2 for setting the achromatic color determining ranges toward green or fluorescent lamps allows only the tracing range toward fluorescent lamps to be changed.

In this embodiment, the achromatic color determining ranges are set using the four sides defining the upper or lower limits designated by T1, T2, Gr1 and Gr2, arbitrarily set by a user. Alternatively, however, an arrangement may be made so that either the color temperature axis or the magenta/green axis can be set arbitrarily. If either the upper limit or the lower limit of the magenta/green axis is fixed, then the other limit may be arbitrarily set by the user.

Thus, the image pickup apparatus allows tracing ranges to be set by each color temperature or hue, permitting free WB setting to be accomplished, e.g., "setting for tracing responsive to higher color temperatures, whereas unresponsive to lower color temperatures." In other words, the image pickup apparatus enables a user to arbitrarily set the AWB tracing ranges, thus achieving a higher degree of freedom and optimum AWB according to the taste and/or intention of the user and the place where the user is located.

Figure 10:
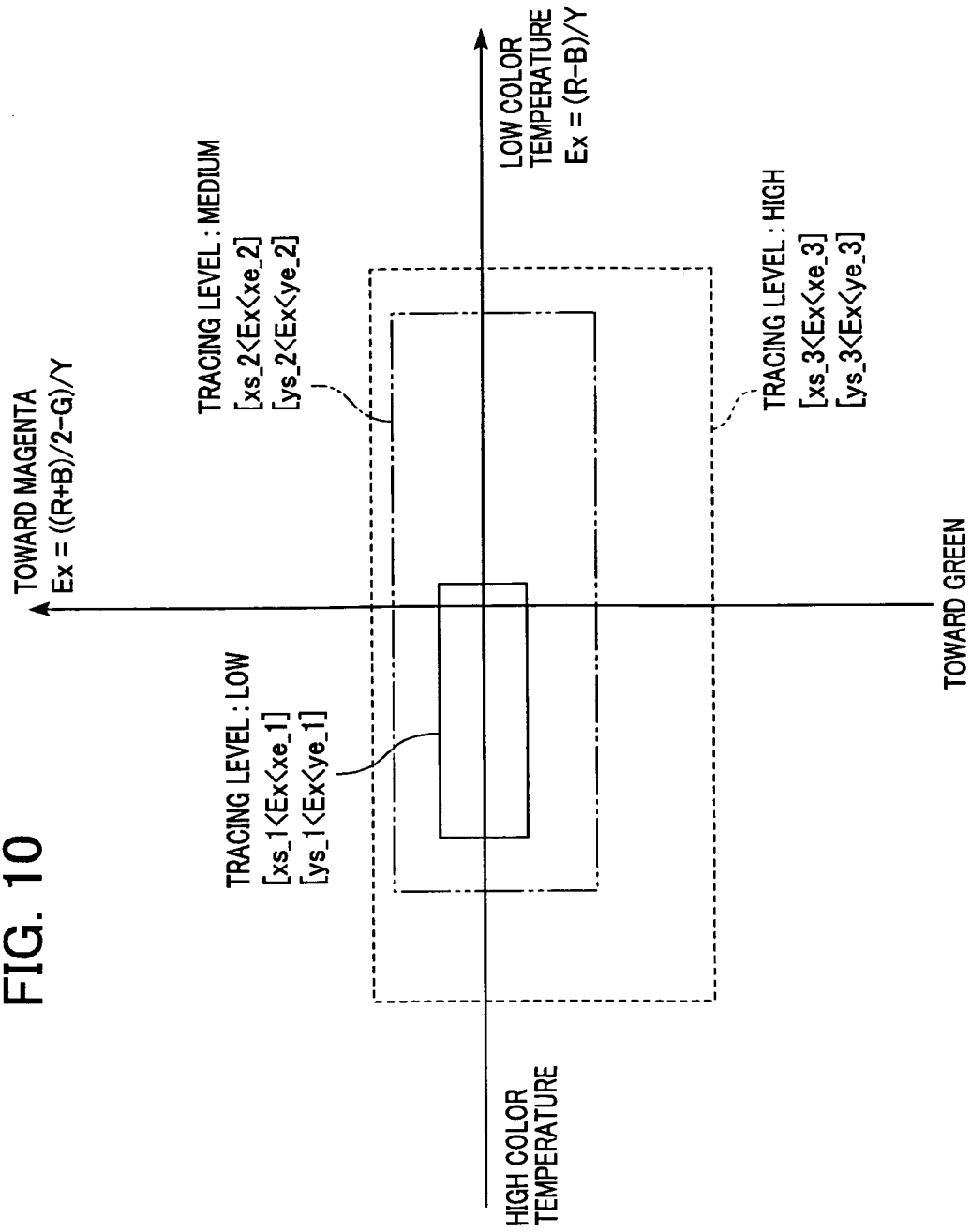
FIG. 10 is a diagram showing an example of an AWB tracing range specifying screen according to the present embodiment.

The color temperatures and the distance toward green on the axis that decides the set values or color assessment values of T1, T2, Gr1 and Gr2 on the aforesaid hue plane are determined, for example, as follows. First, the color assessment values determined from the shooting data obtained by shooting the white points beforehand at the color temperatures of a plurality of light sources existing in the natural world are plotted, as shown in FIG. 9 or 10. From the positional relationship with the coordinates (color temperatures and distance toward green) of the various light sources, the color assessment values set for an achromatic color determining range can be calculated. In this case, the positional relationship can be designated by mapping or the like. Alternatively, the positional relationship may be determined by operation, such as regression operation processing, in advance.

In this embodiment, the achromatic color determining ranges are set using the values or coordinates of T1, T2, Gr1 and Gr2 on the hue plane. Alternatively, however, a user may, for example, use a closed region having a elliptical shape, a cloud shape, etc. in place of the rectangular shape for the range enclosed by the dashed line displayed on the monitor shown in FIG. 9, or changing the size of the closed region, or moving the closed region enclosed by the dashed line to an arbitrary place, thereby setting an achromatic color determining range.

In the above embodiments, the AWB tracing range setting screen shown in FIG. 9 has been displayed on the monitor 110 attached to the image pickup apparatus. Alternatively, however, the AWB tracing range setting screen may be displayed on the screen of a computer terminal or the like by application software or the like that can be run on the computer terminal or the like capable of communicating with the image pickup apparatus. In other words, the present invention is not limited to an image pickup apparatus; the present embodiments according to the present invention may include an image pickup system constructed of an image pickup apparatus and a computer terminal.

In the aforementioned hue plane, the axis of ordinates indicates the hue shifting from green to magenta, and the axis of abscissa indicates the changes in color temperature; however, the present invention is not limited thereto. Various other types of hue planes, such as a CIE chromaticity diagram, may be used. For instance, the hue plane may be arranged such that a black radiation axis or a white axis corresponding thereto provides a first coordinate axis, and the changes in hue from green to magenta are indicated on a second coordinate axis. The achromatic color determining ranges discussed above are not limited to the regions formed of the lines parallel to the axis of abscissa indicating changes in color temperature. The achromatic color determining ranges may alternatively be formed of regions set equidistantly along the axis of ordinates from black radiation curves or white curves equivalent thereto drawn on the color planes in the above embodiments. If, for example, three-dimensional display is possible, then a hue chart may display a multi-dimensional color space.

Third Embodiment

Tracing Level

The schematic construction of an image pickup apparatus in the third embodiment is the same as that of the embodiments discussed above, and the explanation thereof will be omitted. The following will describe only the aspects different from the above embodiments.

In the first and second embodiments, the user designates the tracing ranges to change achromatic color determining ranges. According to the third embodiment, a user sets the achromatic color determining ranges by selecting the tracing levels in achromatic color determining ranges.

FIGS. 3D and 3E show examples of a tracing level selection column 31 and also the changes in color tone of an image displayed on the monitor 110, the changes in color tone being based on selected tracing levels. In FIGS. 3D and 3E, the background of the object is white, and the light source is an electric bulb. Referring to FIG. 3A, the tracing level is set to "low", so that the WB tracing is not effected much under the electric bulb light source, resulting in the displayed image against the background with a reddish color tone. Referring to FIG. 3B, the tracing level is set to "high", so that the WB tracing is fully effected, resulting in an image with a white background.

Figure 4D:
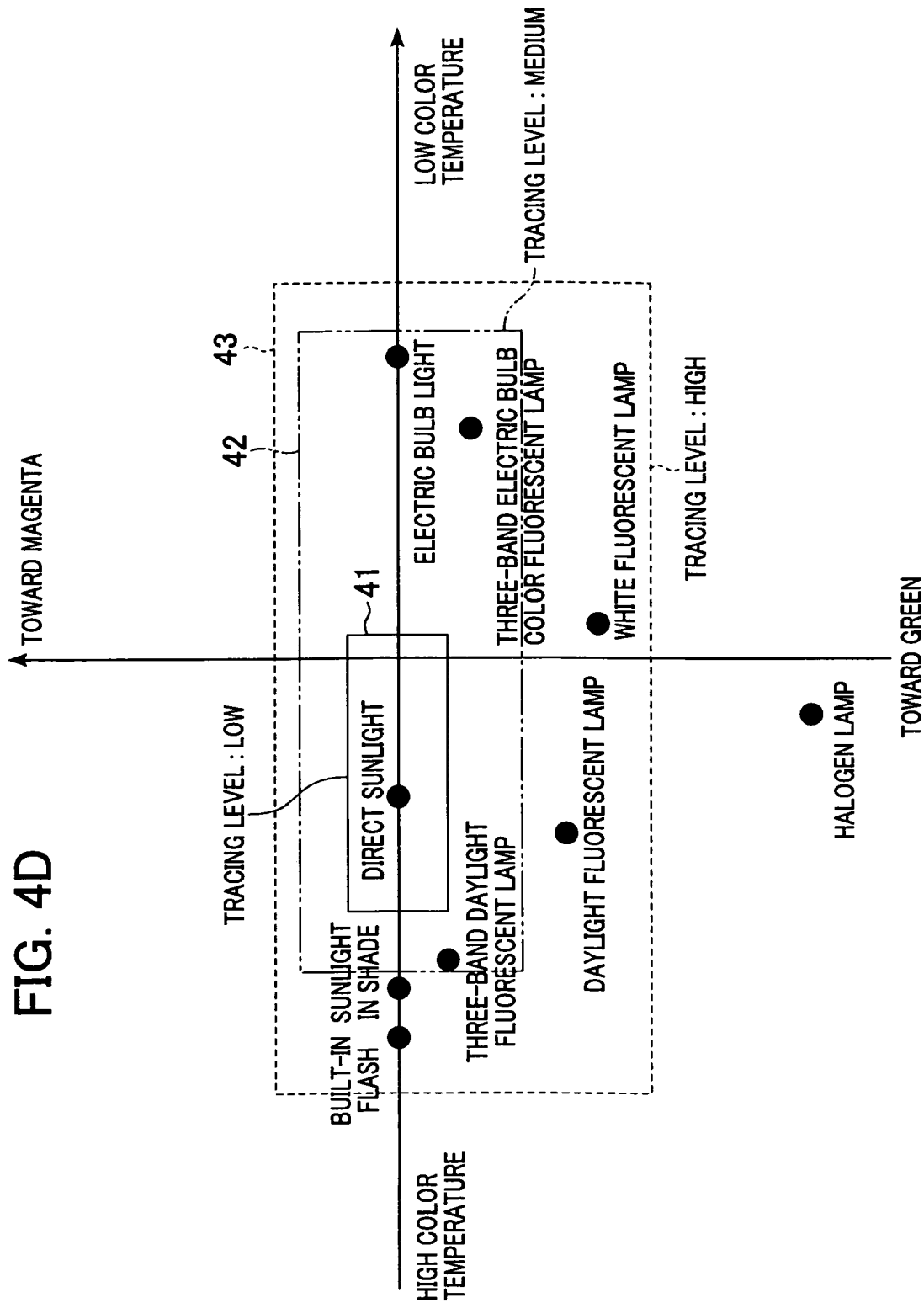

The three tracing levels correspond to, for example, the three different achromatic color determining ranges of the hue plane shown in FIG. 4D, illustrating an example of the hue plane and the examples of the achromatic color determining ranges based on tracing levels. In the hue plane shown in FIG. 4D, the axis of ordinates indicates the changes in hue from green to magenta via white. The axis of abscissa indicates changes in color temperature. An achromatic color determining range 41 corresponds to the low tracing level. An achromatic color determining range 42 corresponds to the medium tracing level. An achromatic color determining range 43 corresponds to the high tracing level. The achromatic color determining ranges 41 through 43 shown in FIG. 4D are designated on the basis of tracing parameters. The coordinates of each light source are shown, together with their names, on the hue plane of FIG. 4D.

As illustrated in FIG. 4D, the tracing levels and the tracing parameters have the following relationship:

Setting the tracing level to "low" provides a tracing parameter in which only the vicinity of direct sunlight is traced.

Setting the tracing level to "medium" provides a tracing parameter in which tracing is performed from an electric bulb to the vicinity of a shaded area.

Setting the tracing level to "high" provides a tracing parameter in which tracing is performed on almost all light sources.

Figure 5B:
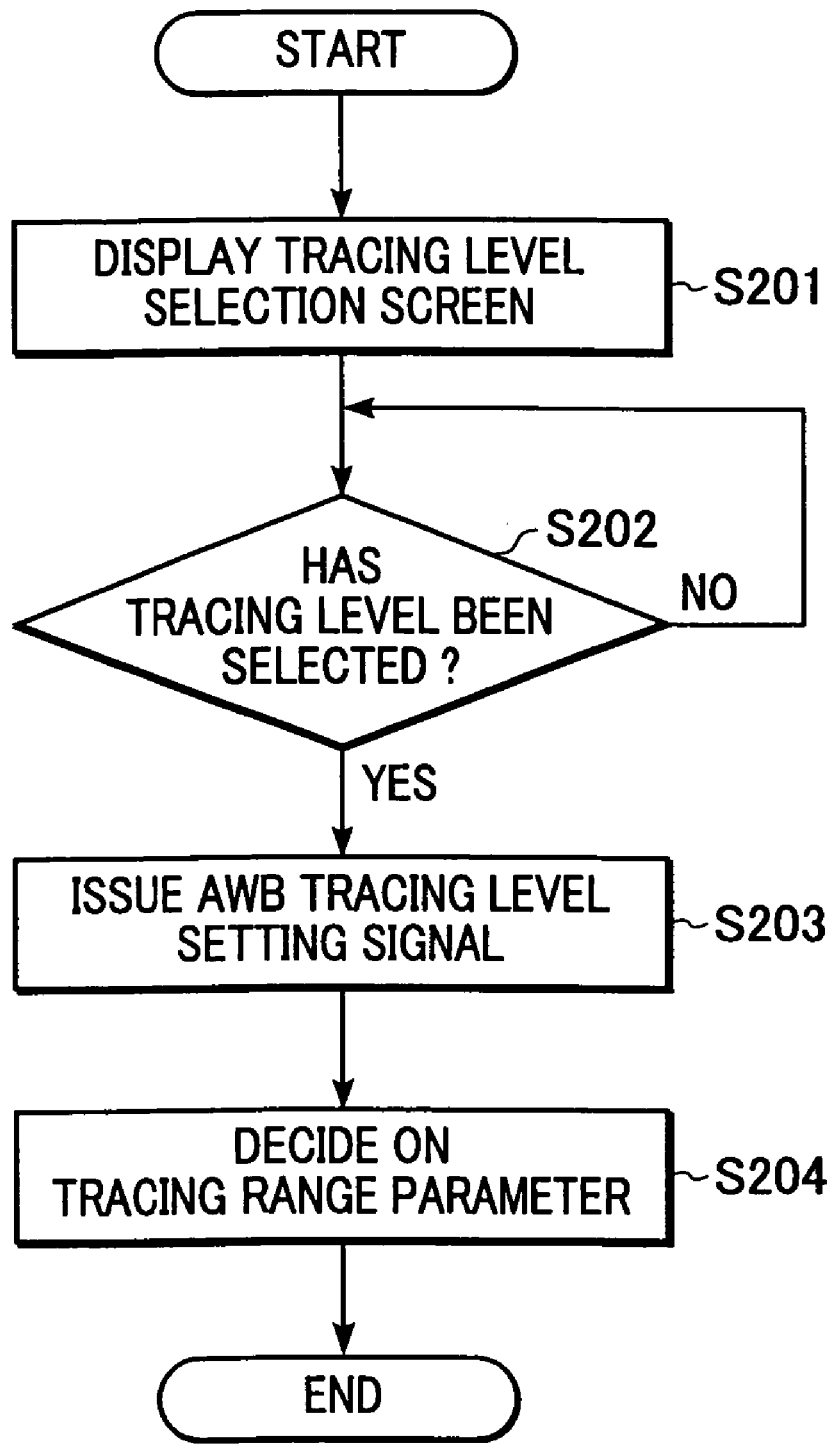

A description will now be given of an operation performed for selecting a tracing range parameter in the image pickup apparatus when a user selects an arbitrary tracing level on the AWB tracing level selection screen shown in FIG. 3D discussed above. FIG. 5B is a flowchart showing the procedure for selecting a tracing range parameter in the image pickup apparatus shown in FIG. 1. The operation of the image pickup apparatus shown in FIG. 5B is begun when the user operates the user interface 112 or performs a similar operation.

First, by operating a user interface 112, the screen for selecting the AWB tracing level, as shown in FIG. 3D, is displayed on a monitor 110 (step S201) so as to prompt the user to select a tracing level. Then, if the tracing level has not been set on the selection screen shown in FIG. 3D (NO in step S202), then the display on the selection screen is maintained until the tracing level is set (loop processing). If a tracing level is set on the selection screen shown in FIG. 3D (YES in step S202), then the setting information regarding the set tracing level is transmitted to the system controller 111 through the user interface 112. Then, the system controller 111 outputs the AWB tracing level setting signal based on the received tracing level to a tracing range selecting circuit 512 (step S203).

Subsequently, the tracing range selecting circuit 512 refers to a tracing range parameter candidate storage 513 for tracing range parameters to select the tracing range parameter based on the received AWB tracing level setting signal and sends the selected tracing range parameter to a signal processing circuit 102 (step S204). This allows the image pickup apparatus to set the tracing range parameter based on the tracing level set by the user on the AWB tracing level selection screen. The image pickup apparatus can thus effect the AWB by using the tracing range parameter based on the tracing level selected by the user.

The internal construction of the image pickup apparatus discussed above is just one example of the preferred embodiment. Any other construction may be applied as long as the imaging element 101 is equipped with a plurality of types of color filters, and performs the feature of AWB described above. Furthermore, in the above embodiment, there are three different tracing levels that can be set; however, any other number of different tracing levels may be set. The sizes and shapes of the achromatic color determining ranges on the hue plane for the tracing levels are not limited to those in the above embodiment; the achromatic color determining ranges may have various other sizes or shapes.

Further alternatively, the switches (not shown) for the light sources may be pressed to combine the regions for a plurality of light sources so as to set an achromatic color determining range, or a user may enter any desired numeral values to set an achromatic color determining range.

The same details of the WB processing whereby the WB correction factor selecting circuit 510 in the above image pickup apparatus decides a WB correction factor apply to this embodiment. Specifically, the image pickup apparatus changes the achromatic color determining range on a hue plane according to a set AWB tracing level so as to change the tracing range on the hue plane in the AWB processing.

A specific example of processing whereby the tracing range selecting circuit 512 changes the tracing range (achromatic color determining range) on the hue plane will now be described.

FIG. 10 illustrates an example of tracing range parameters for setting a tracing range (achromatic color determining range) on the hue plane by the tracing range selecting circuit 512. Referring to FIG. 10, the achromatic color determining ranges on the hue plane are set by tracing range parameters $xs\_1$ to 3, $xe\_1$ to 3, $ys\_1$ to 3 and $ye\_1$ to 3.

As shown in FIG. 10, the tracing range parameters based on tracing levels are set.

Achromatic color determining range at "Low" tracing level:

$$[xs\_1 < Ex < xe\_1], [ys\_1 < Ey < ye\_1]$$

Achromatic color determining range at "Medium" tracing level:

$$[xs\_2 < Ex < xe\_2], [ys\_2 < Ey < ye\_2]$$

Achromatic color determining range at "High" tracing level:

$$[xs\_3 < Ex < xe\_3], [ys\_3 < Ey < ye\_3]$$

As is obvious from FIG. 10, the magnitude relationship of the tracing range parameters based on the tracing levels is expressed as follows:

$$xs\_1 > xs\_2 > xs\_3$$

$$xe\_1 < xe\_2 < xe\_3$$

$$ys\_1 > ys\_2 > ys\_3$$

$$ye\_1 < ye\_2 < ye\_3$$

The above relationship may be summarized as "the achromatic color determining range at high tracing level > the achromatic color determining range at medium tracing level > the achromatic color determining range at low tracing level. This expression of inequality signs indicates the relationship between the WB tracing levels and the achromatic color determining ranges, showing that the WB tracing range expands as the achromatic color determining range is expanded.

The tracing range parameters described above can be independently adjusted. For instance, only the tracing range toward a higher color temperature can be changed by changing the value of the tracing range parameter $xs\_1$ to 3 for setting the achromatic color determining range toward a higher color temperature. Similarly, only the tracing range toward a lower color temperature can be changed by changing the value of the tracing range parameter $xe\_1$ to 3 for setting the achromatic color determining range toward a lower color temperature. Furthermore, only the tracing range toward fluorescent light can be changed by changing the value of the tracing range parameter ye_1 to 3 for setting the achromatic color determining range toward green, i.e., toward the fluorescent light.

Thus, the embodiment described above displays the setting screen on which a user can set the WB tracing level at a desired level, enabling the user to visually determine colors to select an optimum WB setting.

Fourth Embodiment

Combination with Brightness Shooting Mode

A fourth embodiment of the present invention will be described.

In the second embodiment, a description has been given of the case where the AWB is performed by the operational settings made by the user in the achromatic color determining range. In the third embodiment, a description has been given of the case where the achromatic color determining range is changed by changing the tracing level set by the user. In the fourth embodiment, a description will be given of a case where the achromatic color determining range is set by combining the settings made by a user and the shooting conditions, such as a shooting mode and the brightness of an object.

For example, if an object is bright, as in an outdoor mode, then the settable range will be automatically limited to a higher color temperature range, so that the user will set the achromatic color determining range in the higher color temperature range. Similarly, when shooting a dark object, as in an indoor mode, the settable range will be limited to a lower color temperature range.

Thereafter, in the achromatic color determining range that has been limited to a predetermined range based on the brightness, the user further sets a desired range by making the settings on the axis of ordinates (from green toward magenta) and on the axis of abscissa (color temperature) on the hue plane.

The fourth embodiment limits the settable ranges based on brightness, enabling the user to set the desired achromatic color determining range that takes brightness into account. In this embodiment, a description has been given of the case where the settable achromatic color determining range is restricted according to the shooting mode based on brightness; however, the present invention is not limited thereto. Alternatively, for example, the settable achromatic color determining range may be changed according to other shooting conditions or modes based on the types of objects, such as landscapes or portraits, rather than limiting only to brightness.

Other Embodiment

Display of Color Distribution in Reproduction Mode

In the embodiments described above, the WB tracing levels and the achromatic color determining ranges have been set by displaying the hue planes. For instance, following the WB processing, the color distribution of the image to be shot may be plotted on a hue chart. The color distribution on the hue chart may be displayed together with the image to be shot and for which its color distribution needs to be checked, or the image to be shot and the color distribution display may be switched using switches (not shown), or the color distribution display may be superimposed on the image to be shot, as described above.

Thus, displaying the hue chart on the image pickup apparatus enables a user to visually check the color distribution of an image to be shot more easily than in a histogram display.

The processing carried out by the system controller 111 shown in FIG. 1 may alternatively be implemented by dedicated hardware. Further alternatively, the system controller 111 may be constructed of a memory and a CPU that reads programs for executing various types of processing into the memory, and execute the programs so as to carry out the above processing.

The aforementioned memory is constructed of a hard disk device, a magneto-optical disk device, a nonvolatile memory, such as a flash memory, a read-only recording medium, such as a CD-ROM, a volatile memory, such as a random access memory (RAM), or a computer-readable/writable recording medium combining them.

The object of the present invention can be also fulfilled by providing an image pickup system or an image pickup apparatus with a recording medium or a storage medium that stores the programs for implementing the functions of the embodiments described above, so that the computer of the image pickup system or the image pickup apparatus reads and executes the programs stored in the recording medium. The present invention also includes a case where an operating system (OS) or the like running on the computer carries out a part of or the entirely of actual processing according to the instructions of the programs read by the computer so as to implement the functions of the embodiments described above.

Furthermore, the present invention also includes a case where a program code read from the storage medium is written to a memory provided in a feature expansion board inserted in the computer or a feature expansion unit connected to the computer, whereby a CPU or the like provided in the feature expansion board or the feature expansion unit carries out a part of or all actual processing according to the instructions of the program code so as to implement the functions of the embodiments described above.

The preferred embodiments according to the present invention have been explained in detail with reference to the accompanying drawings. Specific constructions, however, are not limited to those of the preferred embodiments; instead, they also include designs or the like that do no depart from the spirit of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus comprising:
    an imaging element which converts light received from an object into an image signal;
    a signal processing device which processes the image signal;
    a display device that displays a multi-dimensional coordinate chart having at least a first coordinate axis representing first changes in hue, a second coordinate axis representing second changes in hue which are different from the first changes in hue, and a plurality of achromatic color determining ranges; and a user interface that allows a user to select a desired location setting within the multi-dimensional coordinate chart displayed in the display device so as to modify at least one achromatic color determining range displayed on the multi-dimensional coordinate chart, wherein the signal processing device performs image processing of the image signal according to the setting.

2. The image pickup apparatus according to claim 1, wherein the display device displays the multi-dimensional coordinate chart together with an image displayed on the basis of the image signal.

3. The image pickup apparatus according to claim 1, wherein the display device switches the display screen between the image displayed on the basis of the image signal from the imaging element and the multi-dimensional coordinate chart in accordance with operation of the user interface.

4. The image pickup apparatus according to claim 1, wherein the display device displays an image of the object to be captured and superimposes the multi-dimensional coordinate chart on the image of the object to be captured.

5. An image pickup apparatus comprising:

an imaging element which converts light received from an object into an image signal;

a signal processing device which processes the image signal;

a display device that displays a multi-dimensional coordinate chart having at least a first coordinate axis representing first changes in hue and a second coordinate axis representing second changes in hue which are different from the first changes in hue; and a user interface that allows a user to select a desired location setting within the multi-dimensional coordinate chart displayed in the display device, wherein the signal processing device performs image processing of the image signal according to the setting, and wherein the signal processing device includes a white balancing device for performing white balancing on the basis of an achromatic color determining range set by the user interface.

6. The image pickup apparatus according to claim 5, wherein the multi-dimensional coordinate chart has color temperatures indicated on the first coordinate axis and another characteristic which is different from the indicated color temperatures on the second coordinate axis.

7. The image pickup apparatus according to claim 6, wherein the second coordinate axis extends in the directions of green and magenta, and the first coordinate axis is a black radiation axis or an achromatic axis equivalent thereto.

8. The image pickup apparatus according to claim 6, wherein the user interface sets the breadth of the achromatic color determining range along the first coordinate axis.

9. The image pickup apparatus according to claim 6, wherein the user interface sets the breadth of the achromatic color determining range along the second coordinate axis.

10. The image pickup apparatus according to claim 5, wherein the user interface arbitrarily sets an upper limit and/or a lower limit of the achromatic color determining range.

11. The image pickup apparatus according to claim 5, wherein the user interface sets the achromatic color determining range by the coordinates on the multi-dimensional coordinate chart.

12. The image pickup apparatus according to claim 5, wherein the user interface sets the achromatic color determining range by changing the shape of a closed region on the multi-dimensional coordinate chart, the closed region representing the achromatic color determining range.

13. The image pickup apparatus according to claim 7, wherein the user interface sets the achromatic color determining range by changing the position of the closed region on the multi-dimensional coordinate chart.

14. The image pickup apparatus according to claim 7, wherein the achromatic color determining range settable by the user interface varies according to the conditions under which an image of the object is captured.

15. The image pickup apparatus according to claim 7, wherein the achromatic color determining range settable by the user interface is limited to a higher color temperature side and/or a lower color temperature side according to the brightness of an object.

* * * * *

UNITED STATES PATENT AND TRADEMARK OFFICE
CERTIFICATE OF CORRECTION

| | |
|---|---|
| PATENT NO. | : 7,388,612 B2 |
| APPLICATION NO. | : 10/714632 |
| DATED | : June 17, 2008 |
| INVENTOR(S) | : Takaaki Fukui |

It is certified that error appears in the above-identified patent and that said Letters Patent is hereby corrected as shown below:

Col. 3, line 4, "shooter' intention" should read --shooter's intention--.

Signed and Sealed this

Tenth Day of February, 2009

JOHN DOLL
*Acting Director of the United States Patent and Trademark Office*